UNITED STATES PATENT OFFICE.

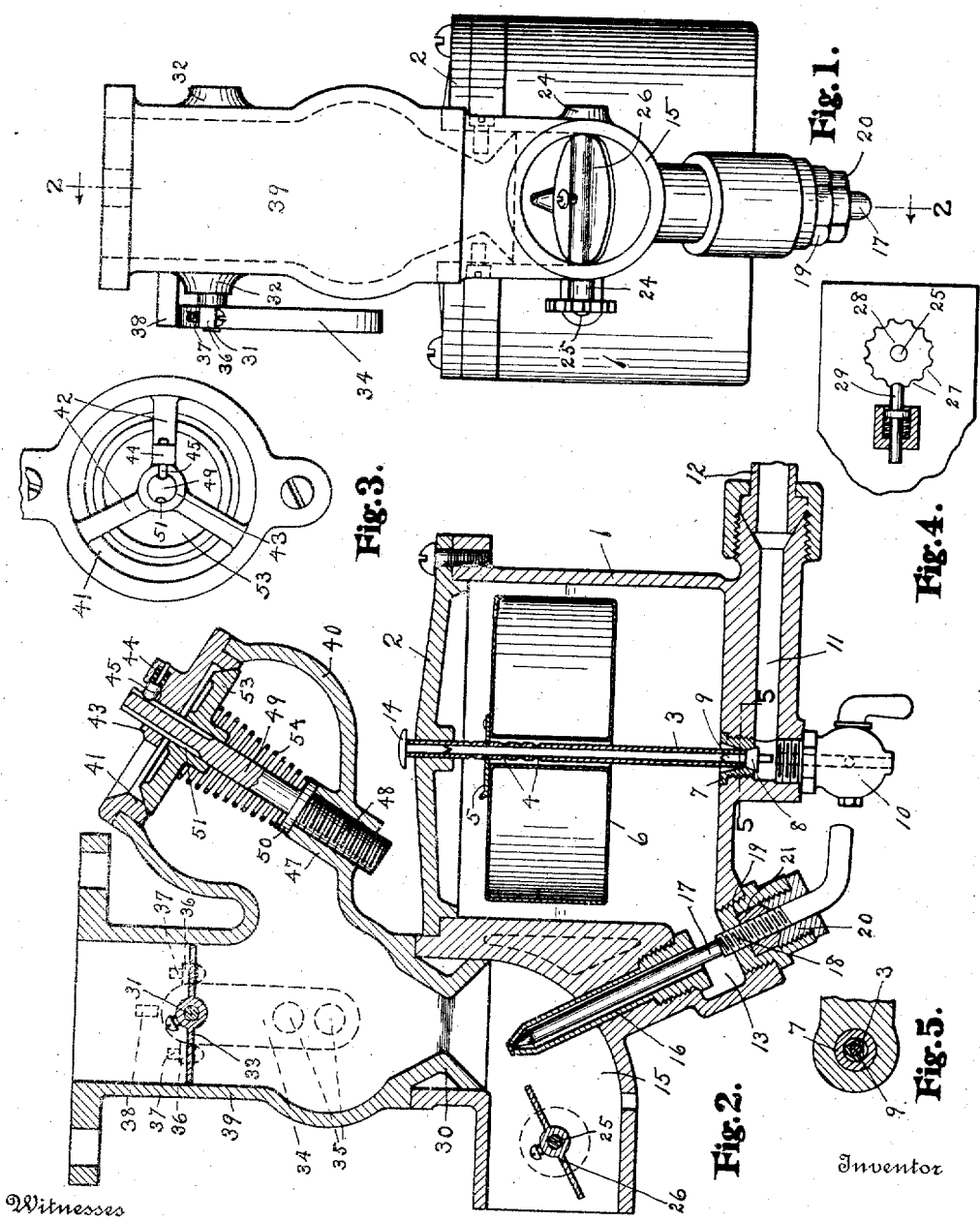

HARRY E. KERR, OF DETROIT, MICHIGAN.

CARBURETER.

1,018,766.  Specification of Letters Patent.  Patented Feb. 27, 1912.

Application filed May 22, 1911. Serial No. 628,679.

*To all whom it may concern:*

Be it known that I, HARRY E. KERR, a citizen of the Dominion of Canada, and a resident of Detroit, in the county of Wayne and State of Michigan, have invented a new and useful Carbureter, of which the following is a specification.

This invention relates to means for carbureting volatile hydrocarbon liquids, principally gasolene, to form explosive mixtures for internal combustion engines, and its object is to provide a device of this kind which shall effectively and completely perform its function, and which may be constructed at comparatively low cost.

In the accompanying drawing, Figure 1 is an elevation of this carbureter. Fig. 2 is a section on the line 2—2 of Fig. 1. Fig. 3 is a plan of the auxiliary air-inlet valve. Fig. 4 is a detail of the holding mechanism of the deflector. Fig. 5 is a section on the line 5—5 of Fig. 2.

Similar reference characters refer to like parts throughout the several views.

This carbureter consists of a carbureting chamber, a float chamber connected thereto, an auxiliary air valve and its chamber, and valves to control the flow of fuel oil and air, both before and after carbureting. The body is preferably formed of two parts as shown in the drawing, as it is more easily manufactured when constructed in that manner, but any other manner of forming the finished construction may be employed.

The float chamber 1 is provided with a head 2, secured in position in any desired manner. A vertical tube 3 is slidable in a small hole in the head and is formed with notches 4 to receive the latch 5, mounted on the float 6. This float may be locked to the tube by the latch at the desired place to control the height of the liquid fuel. The lower end of the tube is flattened as shown in Fig. 5, to permit the upward flow of fuel through the valve seat 7, which screws into a properly threaded hole in the bottom of the float chamber. The valve 8 has a stem 9, which frictionally engages in the lower end of the tube. The float chamber may be drained by means of the stopcock 10. A passage 11 in the base of the float chamber connects to the feed pipe 12 in any desired manner. A passage 13 connects to the bore of the fuel nozzle. A plug 14 may be employed to close the upper end of the tube, and to prevent the valve 8 from closing the passage of the cock 10.

The fuel nozzle extends into the elbow 15 of the mixing chamber and is inclined at an angle of about twenty seven degrees from the vertical. It comprises a tube 16 having a tapered end, into which extends a needle valve 17, having a threaded portion 18 screwed into a nut 19. This nut screws into the bottom of the float chamber and may be provided with a gland 20 for pressing the packing 21 around the needle valve. When a large number of carbureters are made for the same type of engine, the discharge opening of the tube 16 may be exactly determined, and the valve 17 may be omitted.

The elbow portion 15 of the carbureting chamber is formed with bosses 24 in which is revolubly mounted the shaft 25 of the deflector 26. A knob 28 on one end of the shaft has notches 27 into which the spring pressed detent 29 engages. Just above the elbow the bore of the mixing chamber is reduced by a ridge 30. Centrally mounted above the ridge is a stem 31 revoluble in the bosses 32 on the mixing chamber 39, to which stem is secured a throttle valve 33. On the outer end of the stem is a crank 34 provided with holes 35 where any desirable connector may be attached. The crank has lugs 36 which carry set screws 37 which contact with the lug 38 on the body when the throttle is closed or entirely open.

A valve chamber 40 connects to the mixing chamber 39 and has an annular valve seat 41 secured to it. The seat is provided with cross bars 42 which support a central guide-ring 43. On this ring is a boss 44 which carries a spring-held pin 45. The construction of this boss may be the same as that shown in Fig. 4. A hub 47 projects from the inner wall of the valve chamber and receives the screw-threaded end 48 of the valve stem 49. This stem has a collar 50 and grooves 51 in which grooves the pin 45 engages to prevent the stem from turning. A valve 53 is slidable on this stem, being normally held on its seat by a spring 54. The stem 49 is preferably inclined at an angle of thirty degrees from the vertical.

The operation of float chambers is well known. In the present case the fuel level may be controlled by the position of the float on the tube 3, but it is preferably somewhat below the outlet opening of the fuel nozzle. The engine to which this carbureter is connected, at its intake stroke, causes a partial vacuum at the end of the nozzle, which will cause a flow of fuel therefrom. It also causes a rush of air through the elbow 15. The deflector 26 divides this flow of air so that the stream of air that passes below the deflector takes up the fuel from the end of the nozzle in small particles. The stream of air that passes above the deflector strikes the mixture of air and fuel, causing a breaking up of the particles of fuel and a more intimate mixture, being assisted therein by the ridge 30 which causes an acceleration of the air at that point and an eddy below it. When the mixed air and fuel has passed the reduced portion of the bore and entered the chamber 39, its speed decreases and it meets and mixes with a stream of air which is admitted by the valve 53. This causes an eddy and completes the carbureting. The rate of flow of the air through the elbow 15 is controlled by the position of the valve 33 and by the tension of the spring 54. The deflector 26 will be securely held in the position where the best results are obtained. It has been found that the placing of the nozzle and the valve stem 49 at the angles above set forth are an important factor in the production of the best results.

The details and proportions of the various parts of this carbureter may be varied to meet individual requirements by those skilled in the art without departing from the spirit of my invention.

Having now explained the construction of this carbureter, what I claim as my invention and desire to secure by Letters Patent is:—

1. In a carbureter, the combination of a body having an elbow at its lower end comprising a primary air inlet passage, an outlet passage, and a secondary air inlet; a fuel nozzle connecting into the elbow at its convex portion, a deflector adjustably mounted in the elbow between the inlet opening and the fuel nozzle and adjacent the fuel nozzle, and means to lock the deflector in the desired position to control the proportion of the entering air passing the orifice of the nozzle.

2. In a carbureter, the combination of a body having an elbow at its lower end comprising a primary air inlet passage, a reduced portion intermediate its ends, an outlet passage and a secondary air inlet between the outlet and the reduced portion, a throttle valve mounted in the outlet passage, a fuel nozzle connecting into the elbow between the air inlet and the reduced portion of the body, a deflector mounted in the elbow between the air inlet and fuel nozzle to control the proportion of the entering air which passes the orifice of the nozzle, means to lock the deflector in desired position, and a valve for normally closing the secondary air inlet.

In testimony whereof I have signed this specification in the presence of two subscribing witnesses.

HARRY E. KERR.

Witnesses:
ELIZABETH M. BROWN,
EDWARD N. PAGELSEN.